(12) United States Patent  (10) Patent No.: US 6,658,683 B2
Parvin                     (45) Date of Patent:      Dec. 9, 2003

(54) POSTURIZED FOAM PLY FOR USE IN A BEDDING OR SEATING PRODUCT

(75) Inventor: Eddie L. Parvin, Corinth, MS (US)

(73) Assignee: L&P Property Management Company, South Gate, CA (US)

( * ) Notice: Subject to any disclaimer, the term of this patent is extended or adjusted under 35 U.S.C. 154(b) by 68 days.

(21) Appl. No.: 09/804,750

(22) Filed: Mar. 13, 2001

(65) Prior Publication Data

US 2001/0029632 A1 Oct. 18, 2001

Related U.S. Application Data

(60) Provisional application No. 60/189,111, filed on Mar. 14, 2000.

(51) Int. Cl.[7] .............................................. A47C 27/15
(52) U.S. Cl. ..................... 5/727; 5/740; 5/739; 5/730
(58) Field of Search ...................... 5/727, 728, 730, 5/739, 740, 691, 717, 721

(56) References Cited

U.S. PATENT DOCUMENTS

| 3,652,376 A | 3/1972 | Bowden |
| 3,873,388 A | 3/1975 | Hunter |
| 4,180,877 A | 1/1980 | Higgins |
| 4,369,534 A | 1/1983 | Wright |
| 4,414,696 A | 11/1983 | Weitzel |
| 4,578,834 A | 4/1986 | Stumpf |
| 4,985,951 A * | 1/1991 | Lacotte et al. ................ 5/722 |
| 5,136,740 A | 8/1992 | Kraft |
| 5,319,814 A | 6/1994 | Dyer |
| 5,461,737 A | 10/1995 | Ikeda et al. |
| 5,579,549 A | 12/1996 | Selman et al. |
| 5,701,623 A * | 12/1997 | May ............................. 5/739 |
| 5,704,085 A | 1/1998 | Sabalaskey |
| 5,721,035 A | 2/1998 | Dunn |
| 5,960,496 A | 10/1999 | Boyd |
| 5,974,609 A | 11/1999 | Nunez et al. |
| 6,023,803 A | 2/2000 | Barman |
| 6,192,538 B1 | 2/2001 | Fogel |
| 6,360,390 B1 * | 3/2002 | Bonaddio ....................... 5/717 |

FOREIGN PATENT DOCUMENTS

| FR | 2 540 427 A | 8/1984 |
| JP | 60085930 A | 5/1985 |
| JP | 92002818 | 2/1992 |

* cited by examiner

Primary Examiner—Michael F. Trettel
(74) Attorney, Agent, or Firm—Wood, Herron & Evans LLP

(57) ABSTRACT

A posturized foam topper pad (12) for use in a bedding or seating product (10) has at least one section (28) which includes latex, and at least one section (26) which is free of latex, thereby providing the foam topper pad (12) with different degrees of firmness.

20 Claims, 6 Drawing Sheets

POSTURIZED FOAM PLY FOR USE IN A BEDDING OR SEATING PRODUCT

CROSS-REFERENCE TO RELATED APPLICATION

This application claims the benefit of the filing date of Provisional U.S. Patent Application No. 60/189,111 entitled "Posturized Foam Pad with Latex Bands", filed on Mar. 14, 2000, the entire disclosure of the provisional application being incorporated in its entirety into this application by reference.

BACKGROUND OF THE INVENTION

1. Field of the Invention

This invention relates to a posturized foam ply for use in a bedding or seating product, and more particularly, to such a foam ply which selectively incorporates latex in order to provide the foam ply with different degrees of firmness.

2. Description of the Related Art

Foam pads for use in bedding or seating products are known. These foam pads commonly are made of an open-cell polyurethane foam and extend across the entire width and length of the particular bedding or seating product. If the particular bedding or seating product is a mattress, typically one such foam pad is placed on one side of the mattress core, and a second foam pad is placed on the opposite side of the mattress core, thereby effectively "sandwiching" the mattress core. This combination then typically is covered with an upholstered fabric covering.

Some foam pads have been designed so as to provide multiple degrees of stiffness or firmness. In particular, in a bedding structure which includes an innerspring mattress and a padded cover, the padded cover includes a sheet of convoluted foam which covers essentially the full length of the mattress. The sheet of convoluted foam is stiffened over the middle part of the mattress length by a complementary piece of convoluted foam which is mated with the initial sheet. While the complementary piece may assist in providing an area of increased stiffness, this additional piece results in added thickness to that particular area of the padded cover, which may prove uncomfortable to a user.

Another mattress has an upholstery topper layer having a firming edge about its perimeter. In further detail, the topper layer has a foam layer and a firming edge which is attached to the perimeter of the foam layer using glue or the like, with the firming edge being made of a material which is more firm than the foam layer. While this particular topper layer may provide edge support for a mattress, multiple types of foam or other material must be provided and subsequently attached, in order to provide a single ply.

SUMMARY OF THE INVENTION

The above-mentioned drawbacks and limitations have been overcome by a posturized foam ply for use in a bedding or seating product, in which the foam ply has a first section which includes latex, and a second section which is free of latex, thereby providing the foam ply with different degrees of firmness. With the selected application of latex to a single foam ply, a posturized foam ply product may be achieved without the need for either a convoluted foam surface or multiple blocks or pieces of foam being glued or otherwise attached to one another.

The invention also is directed to a posturized bedding or seating product, in which the product has a core, an upholstered covering, and a posturized foam ply. In further detail, the core has a first surface and an oppositely-disposed second surface, and the upholstered covering covers at least one of the core first and second surfaces. The foam ply, itself, is positioned between the core and the upholstered covering, with the foam ply having a first section which includes latex and a second section which is free of latex, thereby providing the foam ply with different degrees of firmness.

In addition, the invention is directed to a method of making a posturized foam ply for use in a bedding or seating product. In this aspect of the invention, the foam ply has a first surface, an oppositely-disposed second surface, an interior between the first and second surfaces, and a depth which extends from the first surface to the second surface. The method, itself, includes the steps of: applying latex to a first section of one of the first and second surfaces, while maintaining a second section of the one of the first and second surfaces free of latex; moving at least some of the latex from the first section into the interior; and curing the latex, thereby forming a foam ply with different degrees of firmness.

BRIEF DESCRIPTION OF THE DRAWINGS

The accompanying drawings, which are incorporated in, and constitute a part of, this specification, illustrate a version of the invention, and, together with the general description of the invention given above, and the detailed description of the drawings given below, serve to explain the principles of the invention.

DETAILED DESCRIPTION OF THE DRAWINGS

As used herein, the term "posturized" refers to an item which has more than one degree of firmness.

Figure 1:
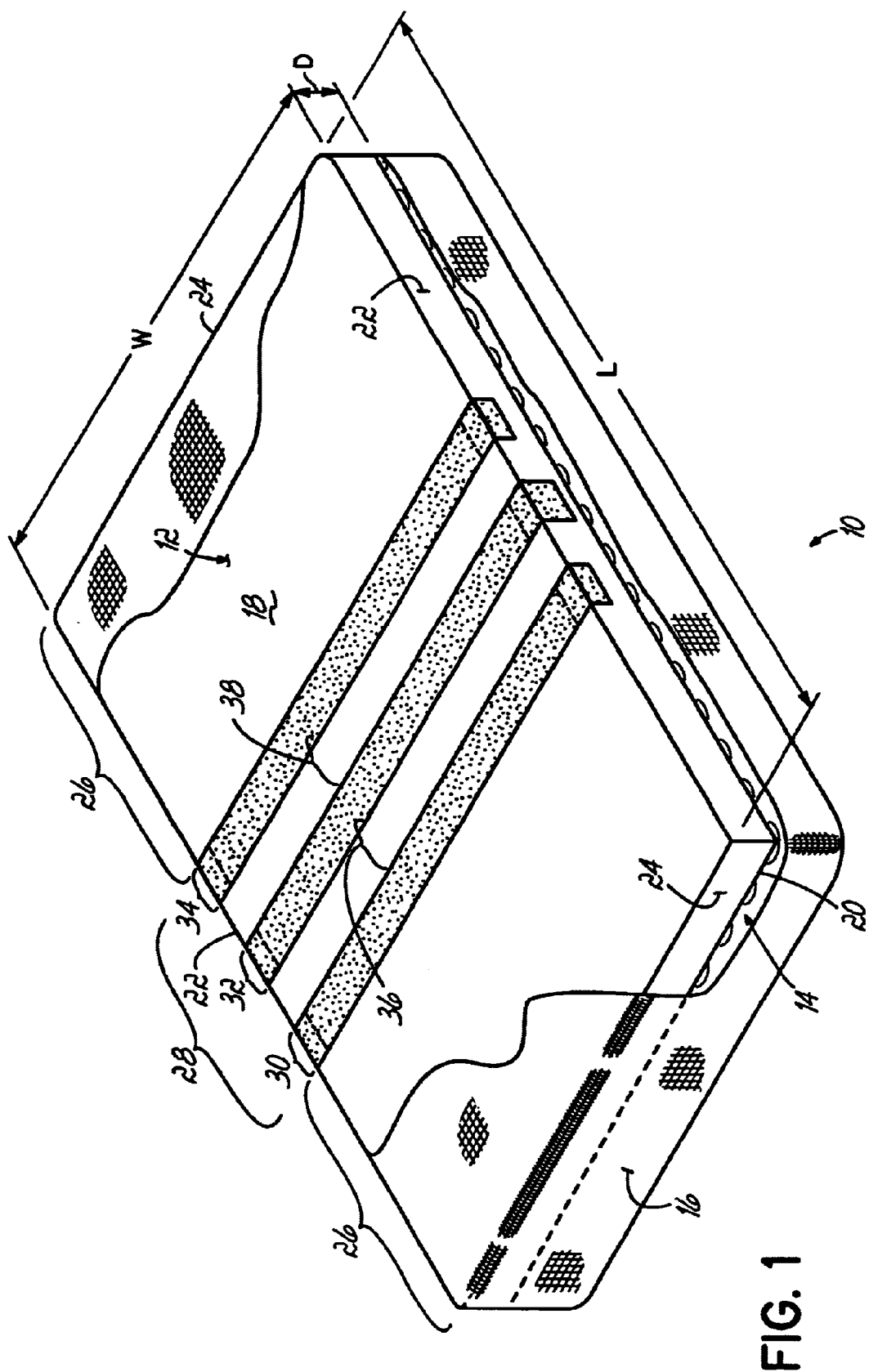
FIG. 1 is a perspective view of a bedding or seating product having a posturized, foam-ply topper pad.

With reference to FIG. 1, a bedding product 10 includes a posturized, foam-ply topper pad 12 atop a core or base 14. The core 14 preferably is a spring core, but also may be a foam core or any other suitable structure. An upholstered cover 16 surrounds the topper pad 12 and core 14. In addition, the topper pad 12 has a longitudinal dimension or length L and a width W which correspond with the length and width of the product, thereby covering the entire upper surface of the core 14. However, if desired, the topper pad 12 may have a length and/or a width which is less than that of the core 14. In further detail, the topper pad 12 has an upper surface 18 and an oppositely-disposed lower surface 20, with the topper pad 12 having a depth D which extends from the upper surface 18 to the lower surface 20. The topper pad 12 further includes generally vertically oriented opposed side surfaces 22 and end surfaces 24.

The topper pad 12 includes several different sections or zones of differing firmness, due to the selective incorporation of latex into a few of these sections or zones. Between first and second end sections 26 of the pad 12, the pad 12 has a central section 28. In further detail, the central section 28 includes three regions or zones 30, 32 and 34 of the foam-ply which have been embedded with latex. Although three regions are illustrated, any number of regions may be used at any location. These zones are substantially parallel to one another, and extend transversely between the side surfaces 22 of the pad 12. In addition, the latex in these zones extends from the upper surface 18 of the pad 12 into the interior of the pad 12. However, the latex preferably does not occupy the entire depth D of the pad 12, although it may do so. In addition, the latex of the middle zone 32 of the three latex-embedded zones occupies a greater portion of the depth D of the pad 12, thereby providing a degree of firmness which is different from that of the adjacent, latex-embedded zones 30, 34, respectively.

As shown in FIG. 1, each of the three latex-embedded zones 30, 32, 34 extends from one side surface 22 to the opposite side surface 22. However, as shown in FIG. 1 in phantom, in an alternate embodiment of the present invention, the latex-embedded bands may extend less than all the way out to the first and second side surfaces. In either case, the latex-embedded zones 30, 32, 34 of the central section 28 are spaced apart so as to provide an intervening pair of zones 36, 38 which are not embedded with latex. In addition, the pair of end sections 26 are free of latex. In this fashion, the mattress 10 includes a topper pad 12 in which the latex-embedded zones are focused in what is referred to as the "lumbar support section" or central section 28 of the mattress 10.

Figure 2:
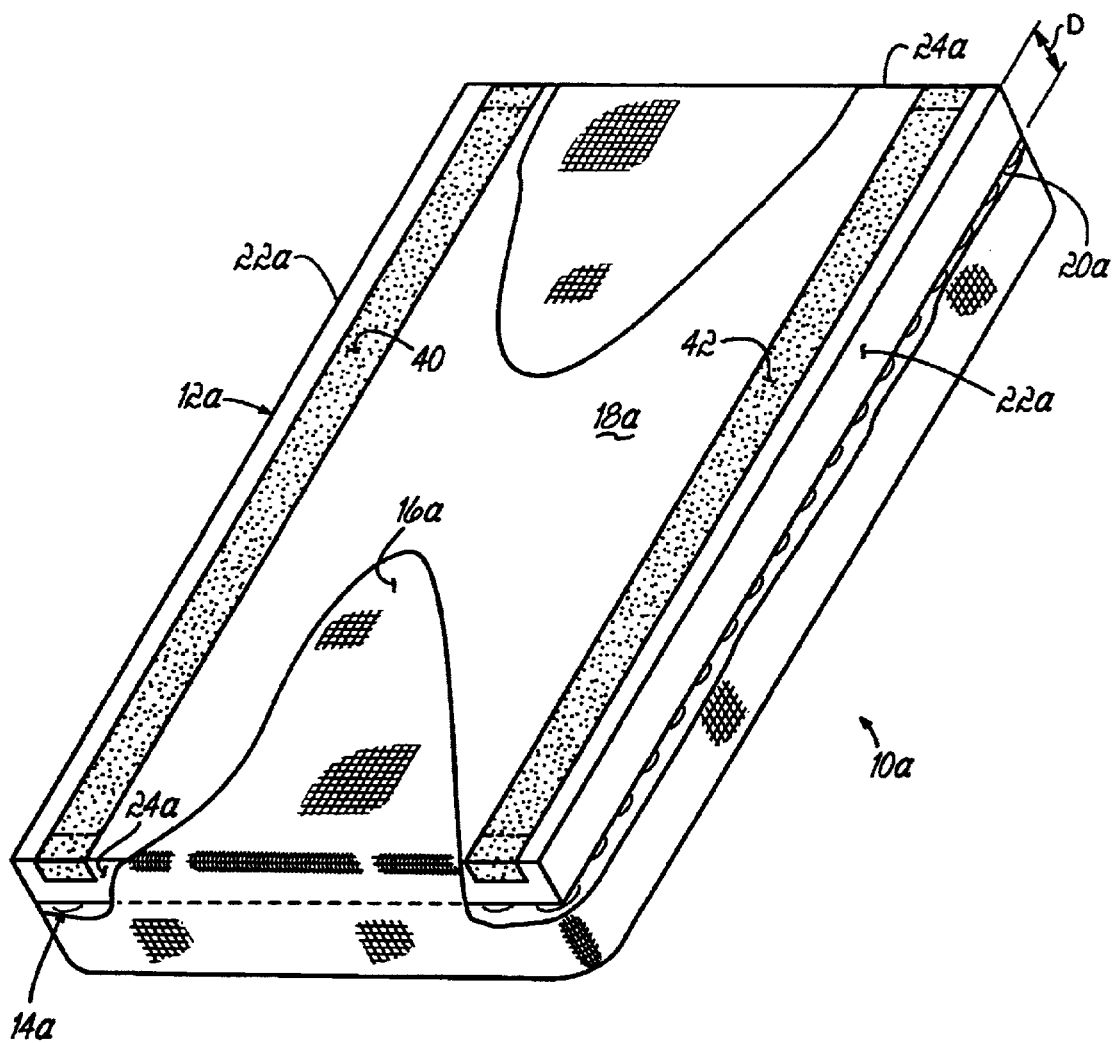
FIG. 2 is a perspective view of a bedding or seating product having another version of a posturized, foam-ply topper pad.

With reference to FIG. 2, an alternate version of a mattress 10a, according to the principles of the invention, includes a posturized, foam-ply topper pad 12a positioned atop a core 14a. Again, the core 14a preferably is a spring core, but may be a foam core or any other suitable structure. An upholstered cover 16a surrounds the topper pad 12a and core 14a. The topper pad 12a also has an upper surface 18a, an oppositely-disposed lower surface 20a, and a depth D which extends from the upper surface 18a to the lower surface 20a. As seen in this particular version of the mattress, the topper pad 12a includes first and second latex-embedded sections or zones 40, 42 extending longitudinally between the first and second end surfaces 24a of the pad 12a, with the first zone 40 being adjacent one of the side surfaces 22a, and the second zone 42 being adjacent the other side surface 22a. In this fashion, the mattress 10a is provided with a posturized, foam-ply topper pad 12a which provides different levels of firmness, particularly along the length of the topper pad, adjacent side surfaces 22a. Each latex-embedded zone 40, 42 includes latex which extends from the upper surface 18a of the topper pad 12a down into the interior of the pad. As shown in FIG. 2, in one version of the pad, the latex-embedded zones extend completely from one end surface to the other end surface. In yet another version (shown in phantom), each of these latex-embedded zones extends longitudinally between the first and second ends, but does not extend completely to the respective ends surfaces 24a of the product.

Figure 3:
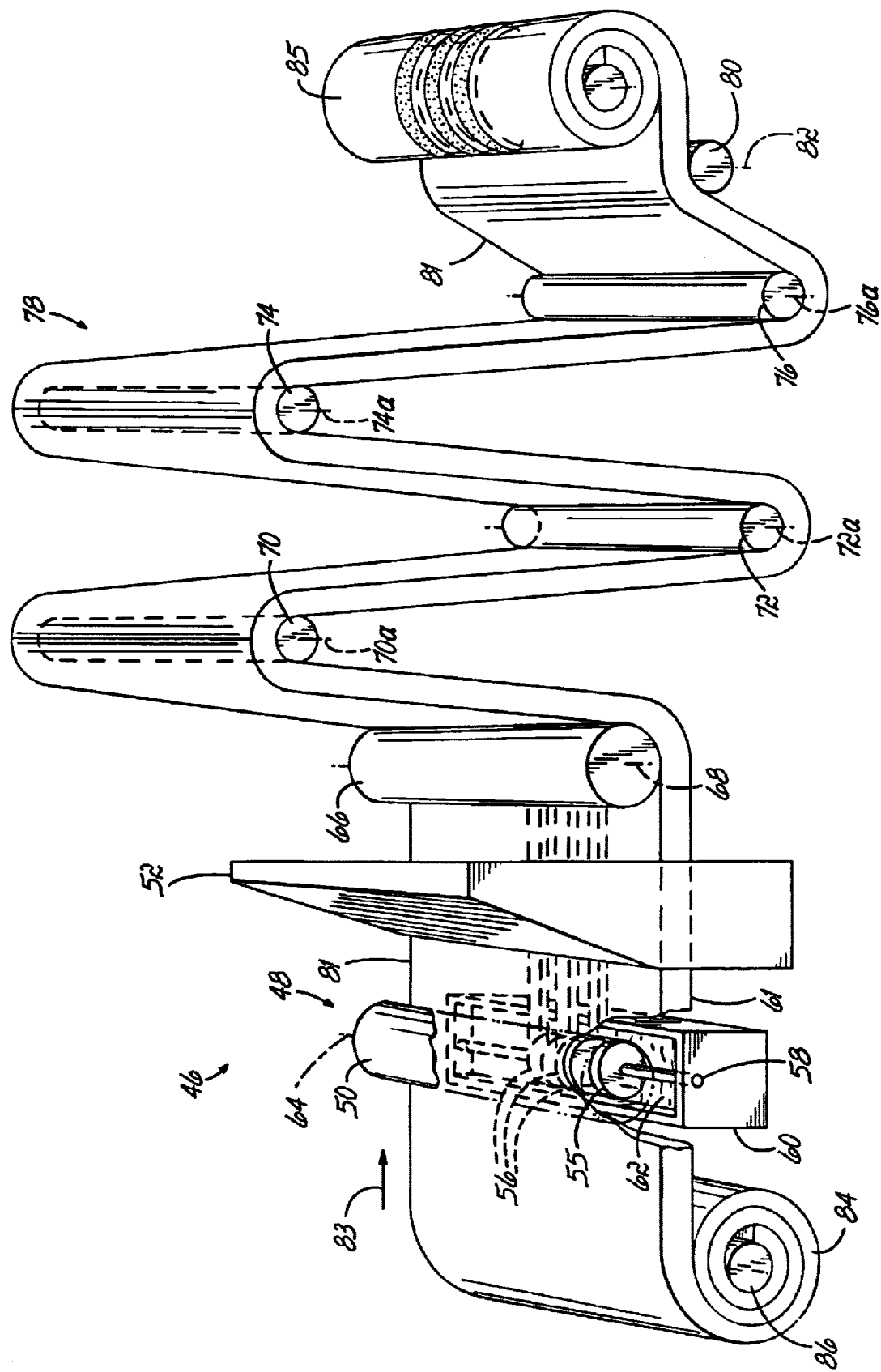
FIG. 3 is a schematic, perspective view of an apparatus and method for making a posturized foam-ply for use in a bedding or seating product.

With reference to FIG. 3, an apparatus 46 is shown for making a posturized foam-ply 12 for use in a bedding or seating product. The apparatus 46 includes an application-roller assembly 48, a control roller 50, an oven 52, and an accumulator 78.

In further detail, the application-roller assembly 48 includes three spaced-apart application rollers 56 coaxially positioned on a single axle 58. Although three application rollers 56 are illustrated and described, any number of application rollers may be positioned on axle 58. The application-roller assembly 48 also includes a tray 60, with the axle 58 and application rollers 56 mounted on or adjacent the tray 60 such that when the tray 60 contains liquid latex 62, the application rollers rotate into the latex 62, thereby picking up a surface coating of latex on the outer surface 55 of application rollers 56, and subsequently transferring this liquid latex 62 to the surface of a foam-ply which passes along and against the application rollers 56. A control roller 50 is positioned above the application rollers 56, with the longitudinal axis 64 of the control roller 50 being parallel to the axle 58 of the application rollers 56. Because the control roller 50 is positioned above the application rollers 56, a space or gap is formed between the control roller and application rollers. In further detail, the height of this space or gap may be selectively adjusted by a user, by adjusting the location of the control roller and/or application rollers using commercially-available and known apparatus (not shown).

An oven 52 is positioned adjacent to, and downstream of, the application-roller assembly 48, and is used to assist in curing the latex which has been applied in liquid-form to a foam-ply as the ply is transported through the overall apparatus shown in FIG. 3. The oven 52, itself, may be any suitable, commercially-available oven. Continuing downstream from the oven 52, the apparatus 46 further includes a directional roller 66 having a longitudinal axis 68, a series of four vertically-staggered rollers 70, 72, 74 and 76, each having an axis 70a, 72a, 74a, 76a respectively, the series of rollers 70, 72, 74 and 76 referred to as an accumulator 78, and an additional directional roller 80 having a longitudinal axis 82. Although the accumulator 78 is illustrated as being four rollers, it may comprise any number of rollers. In addition, any number of directional rollers may be used in the method of the present invention.

As shown in FIG. 3, a single-ply 81 of polyurethane foam (also referred to as a foam-ply) is transported from left to right, as shown by arrow 83, as it makes its way through the apparatus. In further detail, a roll 84 of single-ply polyurethane foam without any latex is positioned adjacent the application-roller assembly 48, with the roll 84 of foam being wound on a spool 86. The application-roller tray 60 is filled to the appropriate level with liquid latex 62. If desired, the liquid latex 62 may be foamed in a latex foaming machine (not shown) and subsequently pumped or otherwise conveyed (not shown) into the tray. As the foam ply 81 passes over the application rollers 56, the application rollers 56 transfer latex from the tray 60 onto the under surface 61 of the polyurethane foam ply 81. In addition, the application rollers 56 may be used alone, or in combination with the control roller 50, to move some of the latex from the bottom surface 61 into the interior of the foam ply 81.

The application-roller assembly 48, control roller 50, and/or other rollers rotate about their respective longitudinal axes. If desired, various rollers in the overall apparatus may be allowed to "passively" rotate (based on the movement of the foam ply through the apparatus), or may be actively rotated using one or more motors or the like (not shown).

A user may selectively adjust the level of penetration of latex into the interior of the foam ply in any of a number of different ways. For example, if desired, latex penetration may be adjusted by selectively adjusting the speed of rotation of the application-roller assembly. In addition, the level of penetration may be adjusted by rotating the application-roller assembly in the direction of the foam ply, or by rotating the application-roller assembly in a direction which is opposite the direction of travel of the foam ply. Generally, if the application roller is rotated in a direction which is counter to the movement of the foam ply, the latex penetrates further into the foam ply. The amount of penetration of latex into the interior of the foam ply also may be adjusted by adjusting the space between the application rollers and the control roller. For example, if the application rollers and control roller are brought close together, such that the height or gap of the space between the two is very small, the foam ply compresses down to the height of this space. And as the foam ply compresses, the latex penetrates into the interior of the foam ply.

As seen in FIG. 3, the three spaced-apart application rollers 56 apply the foamed liquid latex 62 to the lower surface 61 of the foam ply 81. The latex begins to set and cure as the foam ply passes through the oven 52. The foam ply 81 then passes around the series of rollers downstream of the oven, including the series of vertically spaced rollers 70, 72, 74, 76 referred to as the accumulator 78. The accumulator 78 serves to further cure the latex. Once the foam ply 81 has exited the accumulator 78, the ply passes over another roller 80, and is either cut to length (not shown) or wound into a roll 85. In either case, the resulting product is a posturized foam ply for use in a bedding or seating product, in which the foam ply has different degrees of firmness.

Figure 4:
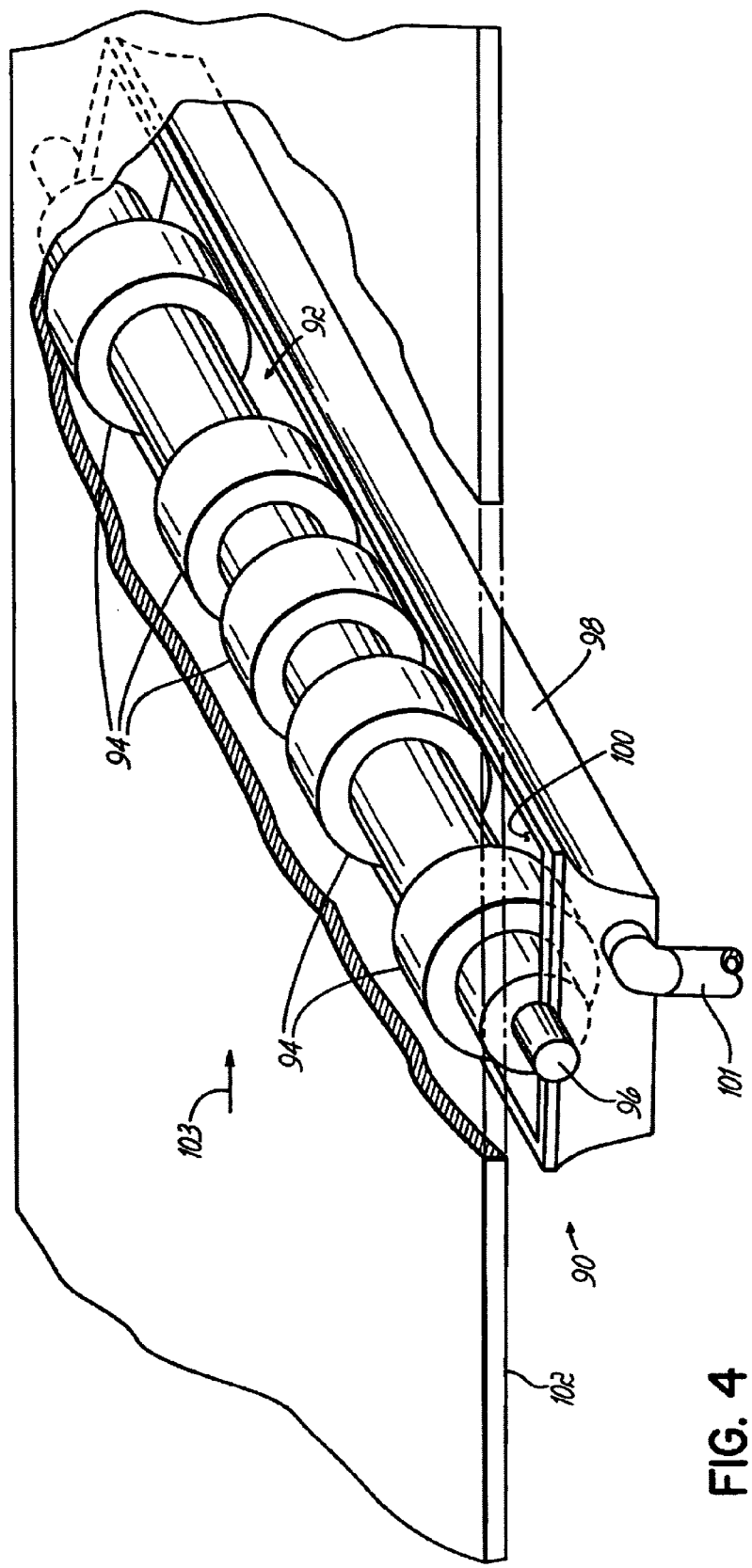
FIG. 4 is a schematic, perspective view of an application-roller assembly for use in making a posturized foam-ply for use in a bedding or seating product.

With reference to FIG. 4, another version of an application-roller assembly 90 includes an application roller 92 and a series of circumferential rings 94 adjustably positioned along the length of the application roller. The application roller 92 further includes an axle 96, and is rotationally mounted on, or adjacent to, a tray 98 containing liquid-latex 100 using one or more commercially available devices. A conduit 101 is connected to the tray 98 and may be used to transport liquid latex from another location (not shown) into the tray 98, as needed. In addition, a section of foam ply 102 from a roll of foam (not shown) moving in the direction of arrow 103 is shown above, and adjacent to, the application-roller assembly 90.

As mentioned briefly above, the circumferential rings 94 may be adjustably positioned anywhere along the length of the application roller 92, thereby enabling an operator to select the location or locations along the foam ply 102 which are to receive liquid latex 100. Although five circumferential rings 94 are illustrated, any number of circumferential rings may be used in accordance with the present invention. The circumferential rings 94 may be releasably secured in place along the length of the application roller 92 using any suitable, commercially-available device or devices (not shown). For example, if desired, bolts may be used. Because the circumferential rings 94 may be securely and releasably positioned anywhere along the length of the application roller 92, an operator is able to create any of a number of different patterns of latex imbedding on a given foam ply in forming a posturized foam-ply product. For example, if desired, two or more rings may be securely positioned in abutting relationship, thereby creating a single latex-embedded section of increased width. In addition, any or all of the circumferential rings 94 may be removed from the application roller 92, thereby providing an operator with even more pattern options.

Of the five circumferential rings shown in FIG. 4, each of the first and fifth rings (the outer rings) has an outer diameter which is greater than that of the second, third, and fourth rings (the inner rings). This feature provides an operator with a way to achieve multiple levels of latex penetration in a given foam-ply. Moreover, an operator is able to achieve these different levels of latex penetration into the foam ply in a single pass, as opposed to having to change circumferential rings and run an already-posturized foam ply through the apparatus a second time. This feature offers a tremendous benefit, not only in the ability to provide a posturized foam ply in which multiple levels of latex penetration may be achieved, but also tremendous time and cost savings, in that no second pass is required. If desired, each of the circumferential rings may be different diameters or select groups of circumferential rings may have a greater diameter than other groups of circumferential rings.

Figure 5:
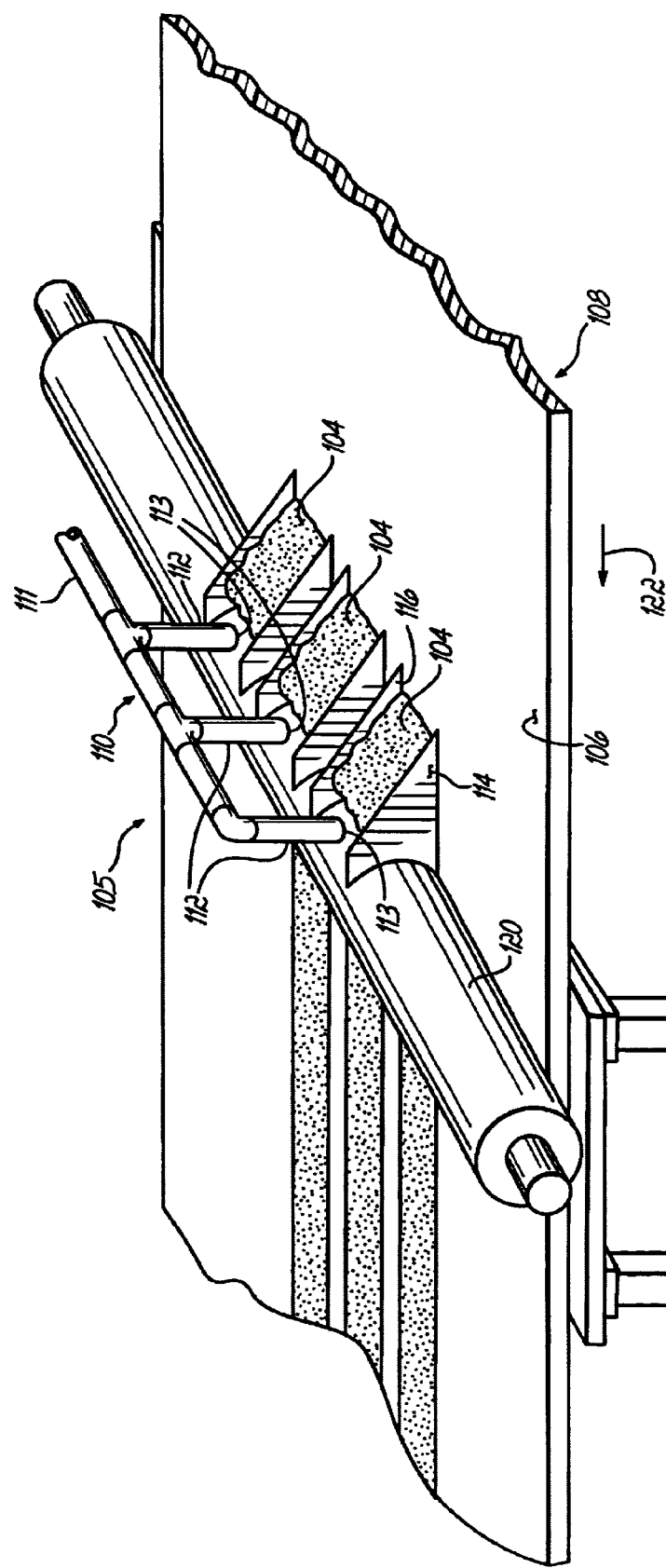
FIG. 5 is a schematic, perspective view of an alternate apparatus for applying latex to a foam-ply in forming a posturized foam-ply.

With reference to FIG. 5, an alternate apparatus 105 and method for applying latex 104 onto a foam-ply surface 106, and moving some of that latex 104 from the surface 106 into the interior of the foam-ply 108, includes tubing 110 positioned above the foam-ply 108, with the tubing 110 having a series of openings 113 for delivering liquid latex onto an upper surface 106 of the foam-ply 108. The tubing 110 includes a horizontal supply tube 111 and downwardly directed tubes 112, each having an opening 113. In this particular version, the apparatus 105 further includes a series of first and second guide plates 114, 116 respectively, which allows an operator to selectively adjust the width of the latex-embedded sections of the particular foam ply by adjusting the transverse distance between the first and second guide plates 114,116. This apparatus 105 further includes an application roller 120 which is adjacent to, and downstream of, the latex-delivery tubing 110 and the guide plates 112, 114. As shown by the arrow 122, the direction of travel of the foam ply 106 is from right to left. The location and spacing of the tube openings 113 and guide plates 114,116 may be selectively adjusted by an operator using one or more commercially-available devices (not shown). In addition, the degree of penetration of the latex into the interior of the foam-ply by the application roller 120 may be selectively controlled using any of the methods described above.

Figure 6:
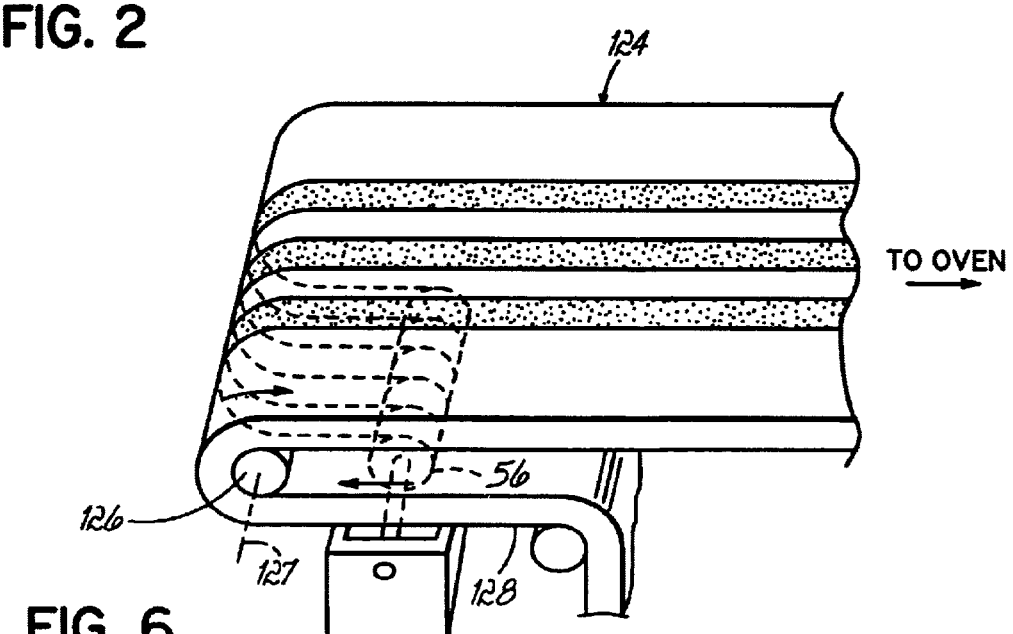
FIG. 6 is a schematic, perspective view of a sub-assembly which may be used in transporting a posturized foam-ply to a drying device.

With reference to FIG. 6, in an alternate version of the overall apparatus 46 (FIG. 3) which assists in transporting a foam ply 124 through various stages of the posturizing process, an inverter roller 126 having a longitudinal axis 127 is positioned downstream of the application-roller assembly 48 (FIG. 3). The inverter roller 126 serves to "flip" the foam ply 124, whereby the lower surface 128 of the ply 124 which received latex from the application rollers 56 now is oriented upward. If desired, this particular inverter-roller set-up may be used in moving the foam ply to an oven, for example, an oven 130 such as the oven shown in FIG. 7.

Figure 7:
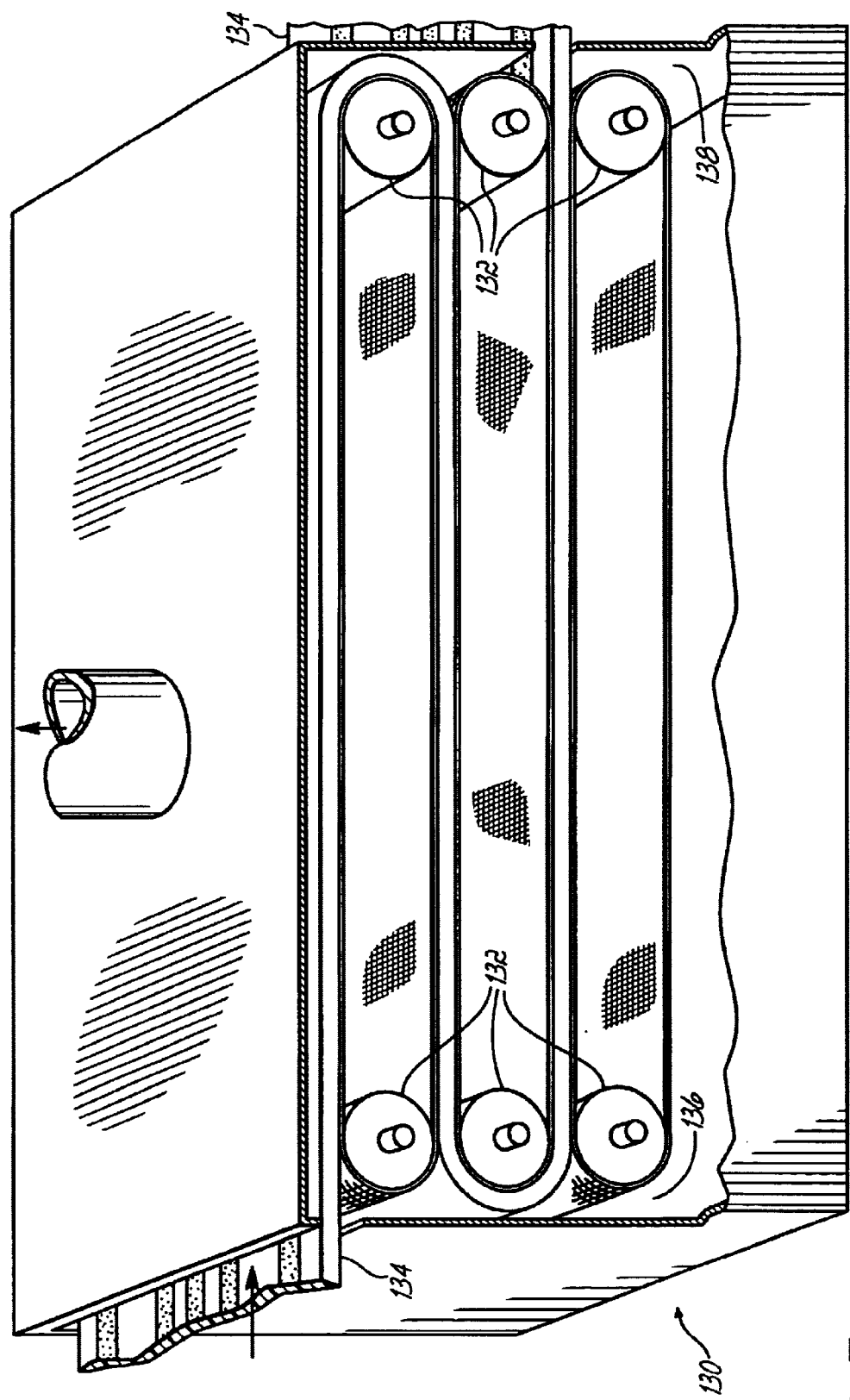
FIG. 7 is a schematic, perspective view of a three-pass oven which may be used in forming a posturized foam-ply.

With reference to FIG. 7, a triple-pass oven 130 includes three sets of rollers 132 which are oriented within the oven so as to enable a foam ply 134 to move from one end 136 of the oven to the other end 138 three times before exiting the oven. This triple-pass system enables the latex to both set and cure before the foam ply 134 leaves the oven 130, thereby eliminating the need for an accumulator. The triple-pass oven 130 also provides the benefit of being compact, in that a foam ply may pass back and forth within the oven, as opposed to moving in a single direction through an oven which is three times as long. After the foam ply 134 exits the oven 130, the posturized foam ply may be cut or sized to a size which is suitable for a particular bedding or seating product (not shown), or may be wound onto a spool and stored or transported for subsequent use. Although three sets of rollers 132 are illustrated and described, any number of sets of rollers may be used in accordance with the present invention.

While the present invention has been illustrated by description of a particular version shown in the drawings, and while the illustrative version has been described in considerable detail, the inventor does not intend to restrict, or in any way limit the scope of the appended claims to such detail. Additional advantages and modifications will readily appear to those of ordinary skill in the art upon reading this detailed description. Therefore, the invention, in its broader aspects, is not limited to the specific details, representative apparatus and methods, and illustrative examples shown and described. Accordingly, departures may be made from such details without departing from the spirit or scope of the inventor's general inventive concept.

What is claimed is:

1. A posturized bedding or seating product, comprising:
    a core having a first surface and an oppositely-disposed second surface;
    an upholstered covering which covers at least one of the core first and second surfaces; and
    a foam ply positioned between the core and the upholstered covering, the foam ply having a first section which includes latex, a second section which is free of latex, and a third section which includes latex, the second section being disposed between the first and third sections, thereby providing the foam ply with different degrees of firmness.

2. A posturized foam ply for use in a bedding or seating product, comprising:
    a foam ply having a first section which includes latex, a second section which is free of latex, and a third section which includes latex, the second section being disposed between the first and third sections, thereby providing the foam ply with different degrees of firmness.

3. The posturized foam ply of claim 2 wherein the foam ply is made of polyurethane.

4. The posturized foam ply of claim 2 wherein the foam ply has a first surface, an oppositely-disposed second surface, and an interior between the first and second surfaces, the latex of the first section extending into the interior from at least one of the first and second surfaces.

5. The posturized foam ply of claim 2 wherein the foam ply has a first surface, an oppositely-disposed second surface, and a depth which extends from the first surface to the second surface, the latex of the third section occupying a greater portion of the depth of the foam ply than the latex of the first section, whereby the firmness of the third section is different from the firmness of the first section.

6. The posturized foam ply of claim 5 wherein the latex of the third section does not occupy the entire depth of the foam ply.

7. The posturized foam ply of claim 2 wherein the foam ply first section extends in a transverse direction.

8. The posturized foam ply of claim 7 wherein the foam ply has a transversely-extending center section, the center section including the first section.

9. The posturized foam ply of claim 8 wherein the foam ply has a first side surface and a second side surface, the latex of the first section extending from the first side surface to the second side surface.

10. The posturized foam ply of claim 9 wherein the latex of the third section extends from the first side surface to the second side surface.

11. The posturized foam ply of claim 10 wherein the third section is substantially parallel to the first section.

12. The posturized foam ply of claim 11 wherein the center section includes the third section.

13. The posturized foam ply of claim 7 wherein the foam ply has a first side surface and a second side surface, the latex of the first section extending between the first side surface and the second side surface.

14. The posturized foam ply of claim 13 wherein the latex of the third section extends between the first side surface and the second side surface.

15. The posturized foam ply of claim 14 wherein the third section is substantially parallel to the first section.

16. The postudzed foam ply of claim 2 wherein the foam ply has a first end surface and a second end surface, the latex of the first section extending between the end surfaces.

17. The posturized foam ply of claim 16 wherein the latex of the third section extends between the end surfaces.

18. The posturized foam ply of claim 17 wherein the third section is substantially parallel to the first section.

19. The posturized foam ply of claim 2 wherein the foam ply has a first end surface and a second end surface, the latex of the first section extending from the first end surface to the second end surface.

20. The posturized foam ply of claim 19 wherein the latex of the third section extends from the first end surface to the second end surface.

* * * * *

UNITED STATES PATENT AND TRADEMARK OFFICE
CERTIFICATE OF CORRECTION

PATENT NO. : 6,658,683 B2  
DATED : December 9, 2003  
INVENTOR(S) : Eddie L. Parvin It is certified that error appears in the above-identified patent and that said Letters Patent is hereby corrected as shown below:

Column 3,  
Line 63, "to the respective ends surfaces 24a of the product :" should read -- to the respective end surfaces 24a of the product --.

Column 8,  
Line 33, "postudzed" should read -- posturized --.

Signed and Sealed this

Second Day of March, 2004

JON W. DUDAS  
*Acting Director of the United States Patent and Trademark Office*